US011509658B1

(12) United States Patent
Kulkarni

(10) Patent No.: US 11,509,658 B1
(45) Date of Patent: Nov. 22, 2022

(54) ADAPTIVE ACCESS CONTROL POLICIES

(71) Applicant: Amazon Technologies, Inc., Seattle, WA (US)

(72) Inventor: Harshad Vasant Kulkarni, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 15/864,976

(22) Filed: Jan. 8, 2018

(51) Int. Cl.
*H04L 9/40* (2022.01)

(52) U.S. Cl.
CPC ............ *H04L 63/102* (2013.01); *H04L 63/08* (2013.01); *H04L 63/108* (2013.01); *H04L 63/20* (2013.01)

(58) Field of Classification Search
CPC ....... H04L 63/102; H04L 63/20; H04L 63/08; H04L 63/108
See application file for complete search history.

(56) References Cited

U.S. PATENT DOCUMENTS

| 7,496,191 B1* | 2/2009 | Crews ................. G06F 21/6218 379/142.02 |
| 8,009,013 B1* | 8/2011 | Hirschfeld .......... G07C 9/00111 235/375 |
| 9,619,631 B1 | 4/2017 | DeHaan et al. |
| 9,853,979 B1* | 12/2017 | Roth ........................ H04L 63/10 |
| 9,923,927 B1* | 3/2018 | McClintock ............ H04L 63/20 |
| 10,380,551 B2* | 8/2019 | Piyush .................. H04L 63/104 |
| 10,567,382 B2* | 2/2020 | Dang ....................... H04L 51/04 |
| 10,846,389 B2* | 11/2020 | Jain ....................... H04L 9/0872 |
| 2004/0088576 A1* | 5/2004 | Foster ................. G06F 21/6218 726/10 |
| 2006/0206931 A1 | 9/2006 | Dillaway et al. |
| 2010/0002248 A1* | 1/2010 | Nuggehalli ........... G06F 21/608 358/1.14 |
| 2014/0325209 A1* | 10/2014 | Koster .................. H04L 63/102 713/158 |
| 2016/0315941 A1* | 10/2016 | Dang .................... G06Q 10/101 |
| 2017/0041296 A1* | 2/2017 | Ford ...................... G06F 16/951 |
| 2018/0097789 A1* | 4/2018 | Murthy ............... H04L 63/0227 |

OTHER PUBLICATIONS

Miller, Kevin Christopher, et al., "Dynamically Adaptive Computer Security Permissions," U.S. Appl. No. 15/634,163, filed Jun. 27, 2017, 51 pages.

* cited by examiner

*Primary Examiner* — Catherine Thiaw
*Assistant Examiner* — Hany S. Gadalla
(74) *Attorney, Agent, or Firm* — Davis Wright Tremaine LLP

(57) ABSTRACT

A set of parameters for a set of permissions are determined based at least in part on previous requests to access a set of resources by a principal or user. The set of permissions are updated based at least in part on the set of parameters such that the set of parameters cause different requests to have different authentication requirements. The updated set of permissions is enforced to control access to computing resources such as the set of resources.

20 Claims, 11 Drawing Sheets

ADAPTIVE ACCESS CONTROL POLICIES

BACKGROUND

Security policies are often based on the concept of least privilege. Least privilege is directed to a client having the minimal access permissions necessary to accomplish required actions and nothing more. Any permissions that have been granted that are not needed to perform a correct function can be abused and or exploited and therefore should not be present. For example, a grant of too few permissions to a client charged with maintenance of a web server may prevent the client from performing essential functions, such as a server restart upon crash. In another example, a grant of too many permissions may allow a client charged with maintenance to make changes that may benefit the web server but break supporting systems, such as a change of static IP address. These additional permissions increase risk if the client's credentials are stolen or used improperly while providing no value.

However, implementing least privilege and, generally the management of permissions, can be difficult, especially in complex systems with multiple users and multiple resources. Client capabilities may not match authorized actions. Performing actions on a first resource may also require permissions to access a second or third resource. For example, a virtual machine may have access to block storage. A system charged with maintenance of the virtual machine may also need permission to clone and attach the block storage. However, in other cases, it may only be believed that access to a secondary resource is necessary, when it is not. Furthermore, client capabilities are not always static. Clients can become more capable or efficient over time, which may include a need for revisiting the security policies for each client. While various techniques have been employed to effectively prepare privilege policies, due to the complexity of the actions, the employed techniques are of varied success.

BRIEF DESCRIPTION OF THE DRAWINGS

Various techniques will be described with reference to the drawings, in which.

DETAILED DESCRIPTION

Figure 1:
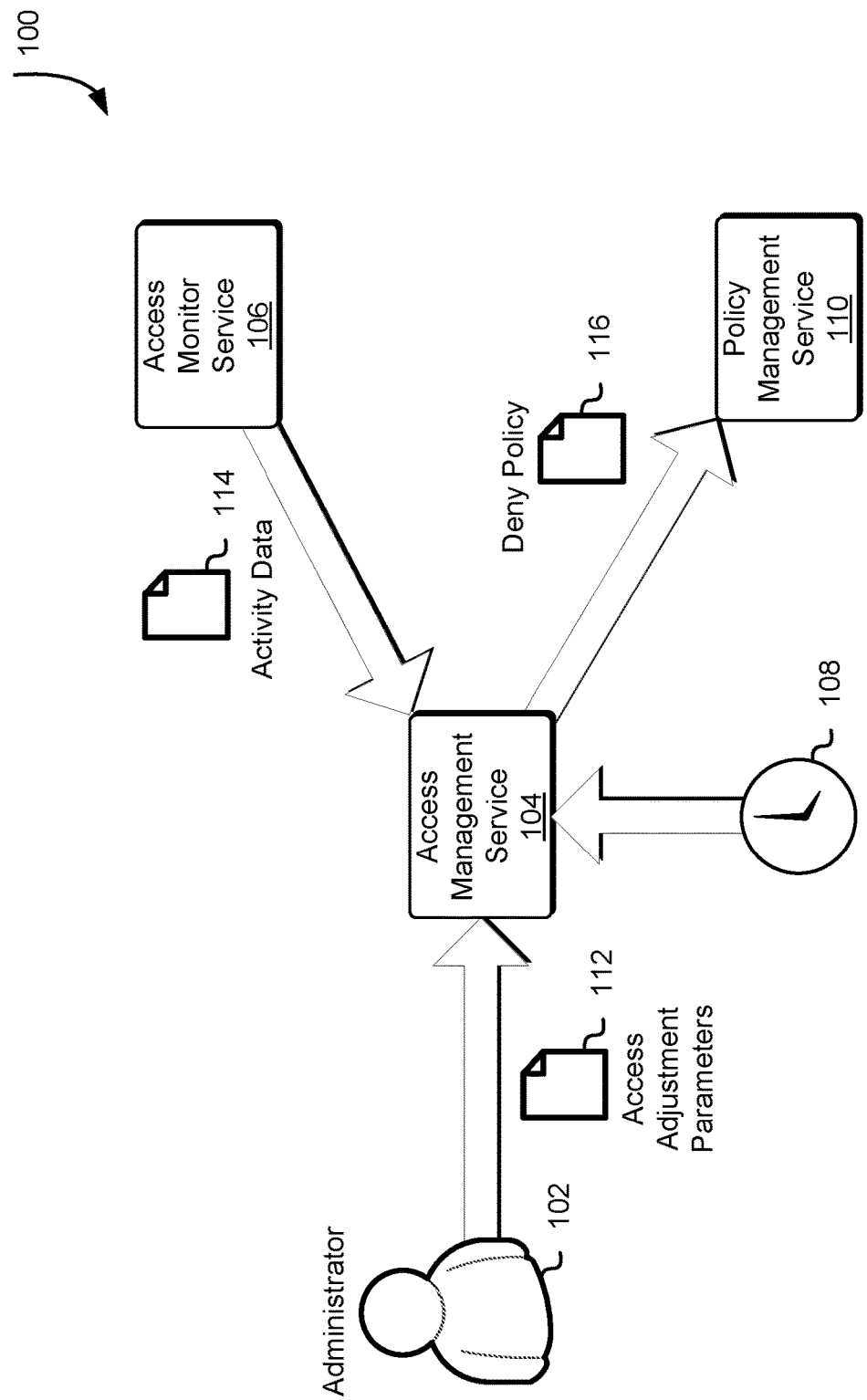
FIG. 1 illustrates a system in which one embodiment may be practiced.

In an embodiment, a system implemented as a computing resource service provider receives requests to access computing resources of the service provider through web service application programming interface requests (API) wherein the requests are received and processed according to a policy associated with the requestor. In an embodiment, a policy comprises a set of permissions that are usable to evaluate whether access to a computing resource should be granted or denied. In an embodiment, the system monitors the activity of a user and records the user's activities as activity data using a logging service and the recorded activity is used to establish a baseline set of actions performed by the user as well as metadata related to the context of that access. In an embodiment, the system analyzes the activity metadata to determine adaptive policies that are automatically injected into authorization context for API calls made by the user. In an embodiment, an adaptive policy refers to data that defines a set of conditions and a set of rules that, if applied, adjusts a user's permissions to access functionality of the computing resource service provider.

In an embodiment, the system includes hardware and/or software to implement a process for managing access to computing resources of a computing resource service provider. In an embodiment, a computer system performing the process receives a set of parameters that are suitable for adapting the security policies for a user of a system such as a computing resource service provider. In an embodiment, the parameters include data to define a set of conditions and/or a set of rules that, if applied, causes a user to gain and/or lose access to functionality of a computing resource service provider. In an embodiment, functionality refers to the ability to access a computing resource and/or perform an action such as call an API.

In an embodiment, the system also obtains activity data that is recorded based on the user's activities and includes the metadata and context information. In an embodiment, the activity data is filtered to include data that is relevant to a particular user and/or filtered based on activity data collected over a time interval. In an embodiment, the activity data is obtained from a logging system that asynchronously aggregates logs from across multiple data sources. In an embodiment, the system analyzes the log data to detect satisfaction of a condition according to the parameters described above and, in response, the system updates a policy according to the parameters described above. In an embodiment, the policy is usable to determine whether the user has access to a computing resource. In an embodiment, as a result of the policy being updated, the user loses access to a computing resource that has not been accessed by the user according to the analyzed data. In an embodiment, a process for adapting access control policies or permissions includes determining a set of parameters for a set of permissions based at least in part on a user's previous requests to access a set of resources, updating the set of permissions based at least in part on the set of parameters such that the set of parameters causes different requests have different authentication requirements, and enforcing access to the set of resources based at least in part on the updated set of access control policies in the manner described herein above and below. In an embodiment, different authentication requirements includes requiring the user complete a multi-factor authentication, requires the user complete a multi-party authentication and/or authorization in conjunction with an administrator, and any combination thereof. In an embodiment, a user receives a session token usable to submit various types of requests to a computing resource service provider such that presentation of the session token in connection with a first request is sufficient to cause fulfillment of the response but presentation of the session token in connection with a second request requires additional authentication, wherein the determination of the authentication requirements is based at least in part on the request context.

In an embodiment, a request context refers to information derived from a request. In an embodiment, the request context is assembled from information associated with the requestor, information associated with the request submission, and/or information associated with one or more computing resources related to the request. In an embodiment, the requestor is a principal whose identity is determined based at least in part on a cryptographic access key. In an embodiment, the principal refers to a root user, a user associated with an identity management system, a federated user (e.g., a user whose identity is provided and/or verified by a third-party service), an assumed role, and more. In an embodiment, request context includes data related to the submission of the request such as the network address (e.g., IP address) associated with the requestor, the user agent, the time of day of the request, an encryption context of the request (e.g., whether the request includes cryptographically verifiable assurances of confidentiality, integrity, and/or authenticity). In an embodiment, the request context includes resource data that pertains to the resource being requested, such as the type of resource, hierarchy information related to the resource, tag information that associates the requested resource to other resources in a logical grouping, and more. In an embodiment, resource types and services have respective key-value pairs for different request contexts.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram of a system 100 in which an embodiment in accordance with this disclosure is implemented. In an embodiment, the system monitors a user's access logs in connection with accessing computing resources of a computing resource service provider. In an embodiment, the system establishes a baseline set of actions, resources, permissions, etc. that are exercised by the user, and creates user specific policies that add restrictive user policies (e.g., policies that deny access to resources, actions, etc.) that result in the revocation of access to resources in accordance with one or more conditions that are definable. In an embodiment, an administrator of a system defines one or more conditions such as a time threshold or time interval that are used to determine whether to apply an adaptive policy. In an embodiment, a time threshold or time interval is identified in a set of parameters or is calculated based at least in part on information included in the parameters. In this way, the security of a computing system is improved by removing unused policies, conforming to principles of least privilege, and reducing the impact of a user's account being compromised (e.g., less information may be exfiltrated by a malicious party that hacks a user's account).

In an embodiment, an administrator 102 refers to an individual or a computing entity controlled by an individual that is capable of performing administrative actions such as defining the security policies associated with other principals (e.g., users). In an embodiment, an administrator 102, via a computing device, sends web application programming interface API) requests to an access management service 104 that dynamically adapts user privileges. In an embodiment, an administrator 102 defines access adjustment parameters 112 for a set of users. In an embodiment, the administrator defines access adjustment parameters for each of multiple individual users, for all users, or for less than all of the users. In an embodiment, the system has a hierarchy wherein a super-user is able to perform administrative actions on the principal.

In an embodiment, the access management service 104 is a service of a computing resource service provider that includes executable code that, if executed on one or more processors of a computer system, causes the system to receive parameters that define an adaptive access control policies that are utilized by a system to limit a user's access rights based on a set of parameters, such as whether the user has exercised an associated access right within a predefined time period. In an embodiment, the access management service 104 is a service of a computing resource service provider that coordinates access management related services with other services of a computing resource service provider such as an access monitor service 106 and a policy management service 110 such as in the manner illustrated in FIG. 1. In an embodiment, the access management service 104 has access to a clock 108. In an embodiment, the clock 108 is hardware, software, or a combination thereof that can be utilized to perform various functions such as obtaining (e.g., via an API) the current system time, converting time formats (e.g., converting a time entry recorded in a particular time zone to a universal coordinate time (UTC) time), and more. In an embodiment, the clock 108 is utilized in connection with an event mechanism that triggers the execution of a script, application, code, etc. in response to the occurrence of an event, the passage of time, or, more generally, the satisfaction of a set of customizable and configurable conditions. In an embodiment, the access management service 104 utilizes the clock to periodically execute a routine (e.g., in the form of a function, script, application, procedure, etc.) that adapts a user's access control policies. In an embodiment, the administrator 102 uses a command line interface (CLI) and/or a user interface (UI) to configure the operation of the access management service 104. In an embodiment, the clock 108 is a component of a computer system of the access management service 104 that is implemented as hardware, software, or a combination of both. In an embodiment, a centralized clock is utilized by a fleet of servers that implements the access management service 104. In an embodiment, a decentralized clock is utilized such that each computer of a fleet of servers that implements the access management service 104 has its own clock.

In an embodiment, an access monitor service 106 is a service of a computing resource service provider that includes executable instructions that, if executed by one or more processors of a computer system, cause the system to obtain, aggregate, filter, and/or otherwise process information regarding the access of resources of a computing resource service provider. In an embodiment, the access monitor service 106 provides access to data from access logs via a set of web API requests. In an embodiment, the access monitor service 106 supports a domain-specific syntax that is used by a requestor to request a particular set or subset of data. In an embodiment, the access monitor service 106 includes and/or utilizes a query processor such as a SQL-based query processor. In an embodiment, the access monitor service 106 accesses activity logs (not shown in FIG. 1) that record (e.g., synchronously or asynchronously) metadata associated with the access of resources of the computing resource service provider. The metadata includes, in an embodiment, a computing resource, an action associated with the computing resource being accessed, and a principal associated with the action. In an embodiment, the access monitor service 106 aggregates data from a plurality of activity logs by obtaining activity data from each of two or more activity logs and processing the activity data (e.g., using a sorting algorithm) to form a chronological ordering of some or all the recorded activity, such as a set of activity logs associated with a particular user within a specified timeframe. In an embodiment, the access monitor service 106 filters recorded activity logs of one or more access logs based on a particular principal (e.g., user or group) over a specified period of time (e.g., the past X days) and returns the list of filtered activity logs in any suitable manner (e.g., a data structure of the list, a reference to such a data structure, a database cursor, and more). In an embodiment, the access monitor service 106 is implemented as a hardware and/or software component of the access management service 104.

In an embodiment, the access management service 104 determines a query based at least in part on information included in the access adjustment parameters 112. Access adjustment parameters 112, in an embodiment, is data that is provided by the administrator 102 to the access management service 104 wherein the access adjustment parameters comprise one or more conditions that define how and/or when access permissions are to be revoked. In an embodiment, the access adjustment parameters are associated with a principal (e.g., a user), identify one or more computing resources, and identify one or more actions (e.g., web API commands). The access adjustment parameters 112 illustrated in FIG. 1, in an embodiment, are in accordance with those described elsewhere in this disclosure, such as in connection with FIG. 7. In an embodiment, the access management service 104 determines the query (e.g., as described above) and issues a request to the access monitor service 106 in accordance with the query, and receives, in response to the request, activity data 114. In an embodiment, the query specifies a principal and a time range, and the activity data 114 includes an ordered list (e.g., in chronological or reverse-chronological order) of recorded activities associated with the principal. It should be noted that, in an embodiment, the principal does not necessarily perform each of the recorded activities—for example, an administrator, in an embodiment is able to perform actions on behalf of a subordinate user using various mechanisms, such as by assuming a role, impersonation (e.g., the ability for one user to execute commands in a security context of another user), and more.

In an embodiment, activity data 114 refers to data that is provided to the access management service 104 in connection with the fulfillment of a request such as the query described above that is based at least in part on information determined from the access adjustment parameters. In an embodiment, the access management service 104 obtains the activity data 114 from the access monitor service 106 based on a periodic schedule (e.g., every 30-minutes, the access management service 104 obtains activity data to determine whether to generate a deny policy). In an embodiment, an event-driven mechanism is utilized that triggers the access management service 104 to perform one or more tasks associated with dynamically adapting user policies, such as obtaining the activity data 114 from the access monitor service 106 and/or generating deny policies 116 based on the obtained activity data 114. In an embodiment, the activity data 114 is an encoded in any suitable manner, such as an in-memory data structure, a reference to such a data structure, a database cursor usable to obtain the underlying activity data, and more.

In an embodiment, the access management service 104 receives the activity data 114 from the access monitor service 106 or any suitable data source and parses the received activity data 114 to determine whether to dynamically adapt a principal's access policies. In an embodiment, the activity data 114 for an individual user is obtained that corresponds to the set of actions that the user has performed within a specified time threshold. If the user has not performed a particular action within the time threshold, the access management service 104, in accordance with one embodiment, generates a deny policy 116 that, if enforced, denies the user access to perform at least the action. If a user has not accessed a computing resource within the time threshold, the access management service 104, in accordance with one embodiment, generates a deny policy 116 that, if enforced, denies the user access to at least the computing resource. In an embodiment, the access management service 104 analyzes the activity data 114 for usage patterns and generates a deny policy 116 that is determined based at least in part on the context in which the activity occurs. In an embodiment, the activity data 114 is analyzed for context related to time, such as whether a user has, within a time interval, performed an action outside of normal business hours (e.g., weekends). In an embodiment, the activity data 114 is analyzed for context related to the requestor's location, as determined based on IP address information of a request, wherein a usage pattern is identifiable based on where the user requests originate from (e.g., a deny policy is generated to exclude other IP addresses if the user only logs in from his residence's IP address). In an embodiment, the access management service 104 generates a command to a policy management service 110 to apply the deny policy 116 to the user's account, thereby revoking access.

In an embodiment, a policy management service 110 is a service of a computing resource service provider that includes executable instructions that, if executed by one or more processors of a computer system, causes the computer system to create, update, and/or enforce security policies associated with principals (e.g., users and groups) of a computing resource service provider. In an embodiment, the policy management service is implementing using a fleet of servers. In an embodiment, the policy management service receives a request from the access management service 104 that includes a deny policy 116, the policy management service 110 receives the request, and adds the deny policy 116 to a set of security policies that apply to a user.

In an embodiment, a deny policy 116 refers to information usable to determine a security policy or portion thereof that, if applied to a user, has a result of causing the user to lose access to functionality of a computing resource service provider such as access to computing resources and/or access to perform certain actions. In an embodiment, a deny policy 116 has the effect of revoking access to a computing resource that is the caused by applying an affirmative deny policy (e.g., a security policy that includes a "DENY" effect) and/or by applying an update to an existing policy that removes all "ALLOW" effects that apply to the computing resources. In an embodiment, the deny policy 116 is conditional, wherein the loss of access applies if and only if a set of conditions are satisfied. In an embodiment, the deny policy includes conditions that deny access during a certain time of day (e.g., weekends, outside of normal business hours), IP address (e.g., only whitelisted IP addresses associated to the user through prior actions are allowed), and more. In an embodiment, a security policy comprises a set of statements that indicate permissions that grant or deny access to computing resources, actions, and other functionality related to the operation of a computing resource service provider. In an embodiment, multiple statements apply to a particular action or computing resource, and if any of the applicable statements includes an effect to deny access, the deny effect supersedes any other allow effects. In an embodiment, an authorization service operates in a deny-by-default environment wherein if no policy statement applies to a particular request, the request is denied (as opposed to an allow-by-default environment where access is allowed in the case where no policy applies to the request).

Figure 2:
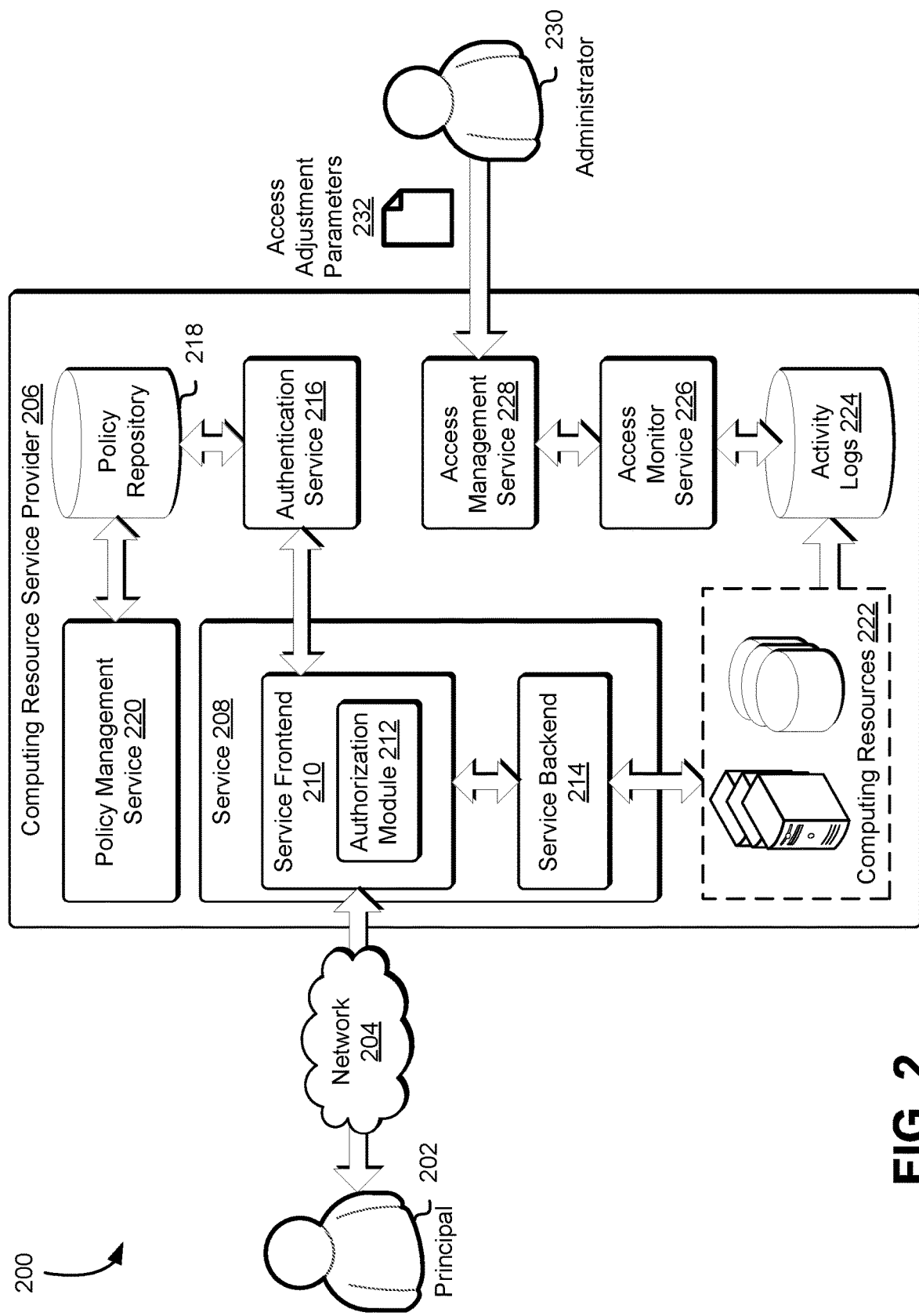
FIG. 2 illustrates a system that implements various aspects of the present disclosure, in accordance with an embodiment.

FIG. 2 illustrates a diagram of a system 200 in which an embodiment in accordance with this disclosure is implemented. In an embodiment, a principal 202 utilizes a computing device to communicate over a network 204 with a computing resource service provider 206. Communications between the computing resource service provider 206 and the principal 202, in an embodiment, include requests (e.g., web API requests) to access a service 208 operated by the computing resource service provider 206, which is one of many services operated by the computing resource service provider 206. The service 208, in an embodiment, comprises a service frontend 210 and a service backend 214. The principal 202, in an embodiment, through an associated computing device, issues a request for access to a service 208 (and/or a request for access to resources associated with the service 208) provided by a computing resource service provider 206. The principal, in an embodiment, refers to a user, or a group of users, or a role associated with a group of users, or a process representing one or more of these entities running on one or more remote (relative to the computing resource service provider 206) computer systems, or may be some other such computer system entity, user, or process. In an embodiment, each or some user, group, role, or other such collection of principals has a corresponding user definition, group definition, role definition, or other definition that defines the attributes and/or membership of that collection. In an embodiment, a principal is an entity corresponding to an identity managed by the computing resource service provider, wherein the computing resource service provider manages permissions for the identity and wherein the entity includes one or more sub-entities, which themselves may have identities.

The principal 202, in an embodiment, communicates with the computing resource service provider 206 via one or more connections (e.g., transmission control protocol (TCP) connections). In an embodiment, the principal 202 uses a computer system client device to connect to the computing resource service provider 206 and refers to any device that is capable of connecting with a computer system via a network, such as example devices discussed below. In an embodiment, the network 204 includes the Internet or another network or combination of networks discussed below.

In an embodiment, the computing resource service provider 206, through the service 208, provides access to one or more computing resources 222 such as virtual machine (VM) instances, automatic scaling groups, file-based database storage systems, block storage services, redundant data storage services, data archive services, data warehousing services, user access management services, identity management services, content management services, and/or other such computer system services. In an embodiment, computing resources 222 include, but are not limited to user resources, policy resources, network resources and/or storage resources. In some examples, the computing resources 222 associated with the computer services include physical devices, virtual devices, combinations of physical and/or virtual devices, or other such device embodiments.

In an embodiment, a user's request to access the service 208 is received by a service frontend 210, which comprises a web server configured to receive such requests and to process them according to one or more policies associated with the service 208. The request for access to the service 208, in an embodiment, is a digitally signed request and, as a result, is provided with a digital signature. In an embodiment, the web server employs techniques described herein synchronously with processing the requests. In an embodiment, the service frontend 210 routes the request and the digital signature for verification to an authentication service 216. The authentication service 216 may be a stand-alone service or may be part of a service provider or other entity. The authentication service 216, in an embodiment, is a computer system configured to perform operations involved in authentication of principals.

Upon successful authentication of a request, the authentication service 216, in an embodiment, obtains policies applicable to the request. In an embodiment, a policy is applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216, in an embodiment, transmits a query to a policy repository 218 managed by a policy management service 220. The query to the policy repository 218, in an embodiment, is a request comprising information sufficient to determine a set of policies applicable to the request. The query to the policy repository, in an embodiment, includes a copy of the request and/or parameters based at least in part on information in the request, such as information identifying the principal, the resource, and/or an action (operation to be performed as part of fulfillment of the request).

A policy management service 220, in an embodiment, provides access to, and administration of, policies applicable to requests (e.g., web service application programming interface requests) for access to computing resources 222. In an embodiment, the policy management service 220 receives information sufficient for selecting policies applicable to pending requests. In an embodiment, the information includes copies of the requests and/or information generated based at least in part on the requests. In an embodiment, a service such as the service frontend 210 receives a request for access to resources and may generate a query to the policy management service based at least in part on information specified by the request.

In an embodiment, access patterns of multiple resources are analyzed as part of determining the mapping of an accessed resource to a set of permissions. In an embodiment, accessing only one data object of a data container maps to a policy that only grants security permissions to access that one data object—however, if two or more data objects of the data container are accessed during a baselining period, then the access of the two objects may map to granting access to all objects of the container. In an embodiment, if a principal accesses one or more resources under a single configuration during the baselining period, that activity maps to a policy that grants permissions only the access resources under that configuration. In an embodiment, a principal initializes and use virtual machine instances to perform tasks, but may do so using a single configuration (e.g., based on CPU, memory, operation system, and other virtual machine settings).

Having obtained any policies applicable to the request, the authentication service 216, in an embodiment, provides an authentication response and, if applicable, the obtained policies back to the service frontend 210. The authentication response indicates whether the response was successfully authenticated, in an embodiment, and the service frontend 210 then checks whether the fulfillment of the request for access to the service 208 would comply with the obtained policies using an authorization module 212.

In an embodiment, the authorization module 212 is a process executing on the service frontend that includes executable code that, if executed by one or more processors of a computer system, cause the computer system to compare the request to the one or more permissions in the policy to determine whether service may satisfy the request (i.e., whether fulfillment of the request is authorized). In an embodiment, the authorization module 212 may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network. In an embodiment, an authorization module is implemented as a software and/or hardware component of an authorization service.

In an embodiment, if the fulfillment of the request for access to the service 208 complies with the applicable obtained policies, the service frontend 210 may fulfill the request using the service backend 214. A service backend 214 may be a component of the service configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

In an embodiment, access to computing resources 222 (e.g., accessed as part of fulfillment of the request) is recorded to one or more activity logs 224 as activity data. In an embodiment, the activity logs 224 are implemented using any suitable storage system, such as a database system. In an embodiment, the activity data recorded associated with fulfillment of a request includes: the user associated with the request, the time the request was received and/or transmitted, the IP address of the requestor computing device, a resource identifier of the computing resource accessed, an action (e.g., a web API) that the resource is being accessed for, and any combination thereof.

In an embodiment, the access monitor service 226 is a service of the computing resource service provider 206 that aggregates activity data from a plurality of data sources, such as a plurality of activity logs. In an embodiment, the access monitor service 226 obtains data from multiple regions or compute zones, which may be organized geographically (e.g., there may be different compute zones by country, continent, or geographical proximity) and aggregates the data from the multiple regions into an ordered set. The access monitor service 226, in an embodiment, provides the aggregated data to the access management service 228.

An access management service 228, in an embodiment, is a service of the computing resource service provider 206 that analyzes activity data and determines whether and/or how to dynamically adapt a user's security policies based on the user's access patterns. In an embodiment, the user's access to access some or all computing resources is revoked based on the user's access patterns (e.g., computing resources not accessed for a predetermined time interval results in the revocation of access to the computing resource). In an embodiment, access adjustment includes one or more conditions, such as the adjustment and/or revocation of the resource applying based on the time of day (e.g., access to resources is revoked on weekends and/or outside of standard business hours of an organization). In an embodiment, the access management service 228 obtains activity data from the activity logs 224 via a request to the access monitor service 226, analyzes the activity data for patterns, and generates revised security policies based on a set of applicable access adjustment parameters, wherein the revised security policies revoke access to one or more resources (e.g., revoke completely or revoke based on the request context). In an embodiment, the access management service 228 applies the revised security policies by submitting a request to the policy management service 220 to modify an existing user's security permissions. In an embodiment, a revised security policy is a deny policy as described elsewhere in this disclosure.

In an embodiment, an administrator 230 refers to a principal computing entity that is capable of performing administrative actions such as defining the security policies associated with other principals (e.g., users) such as the principal 202 illustrated in FIG. 2. In an embodiment, an administrator 230, via a computing device, sends web application programming interface API) requests to an access management service 228 that dynamically adapts user privileges. In an embodiment, the access management service 228 is a service of the service 208 described in FIG. 2 and the administrator requests are subject to authorization and authentication routines as described above and below. In an embodiment, an administrator 230 defines access adjustment parameters 232 for a set of users.

Figure 3:
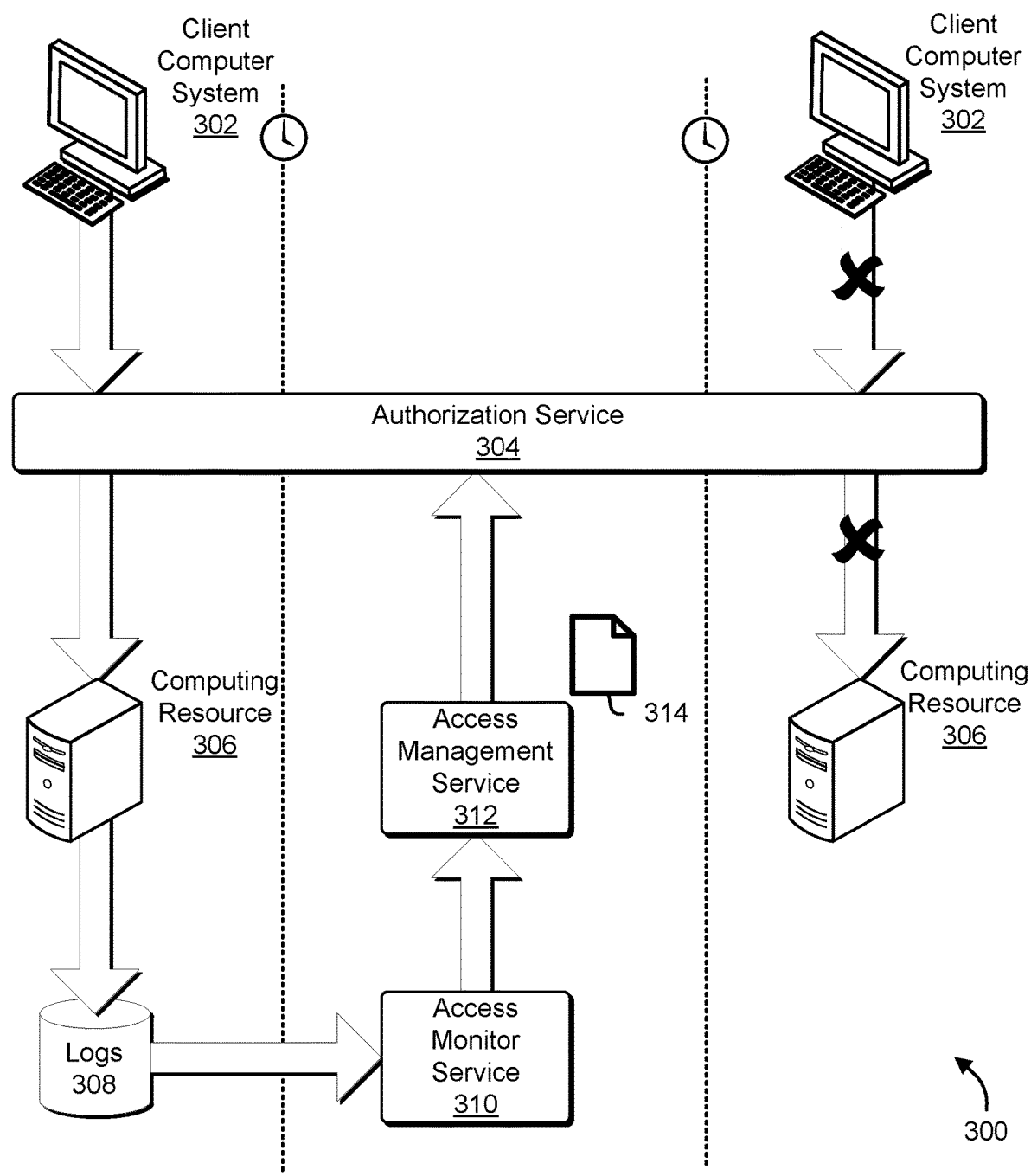
FIG. 3 illustrates a system that implements an access management routine, in accordance with an embodiment.

FIG. 3 illustrates a diagram of a system 300 in which an embodiment in accordance with this disclosure is implemented. In an embodiment, access to a computing resource 306 is adjusted, updated, or otherwise modified in accordance with one or more access adjustment rules, which may be defined based on the access adjustment parameters described in connection with FIG. 7.

A client computer system 302, in an embodiment, is a client of a computing resource service provider that provides access to computing resources 306 such as compute resources, data storage resources, and more. In an embodiment, the client computer system 302 submits a request to access and/or utilize computing resources of the computing resource service provider, and the request is processed by an authorization service 304 that determines, based on one or more applicable security policies (e.g., obtained from a policy management service), whether and/or how to fulfill the request. In an embodiment, a security policy indicates the requestor does not have access to a resource and appropriate action is take, such as denying the request (e.g., not fulfilling the request) or fulfilling the request in accordance with the security policy (e.g., a request to enumerate a container may still be fulfilled in a manner in which objects in the container that the requestor has access to are returned, but objects that the requestor does not have access to are not returned). In an embodiment, the client computer system 302 issues requests as a user of a computing resource service provider having user-specific credentials and/or security policies.

An authorization service 304, in an embodiment, is a service of a computing resource service provider implemented on one or more servers of a fleet of services and includes executable code that, as a result of execution by one or more processors of a computer system, cause the computer system to authorize and/or specify the manner in which requests are to be fulfilled. In an embodiment, the authorization service is implemented in accordance with those described elsewhere in this disclosure, such as in connection with FIGS. 1, 7, and 11.

In an embodiment, at a first point in time $t_1$, a client computer system 302 generates a request to access a computing resource 306 of the computing resource service provider. The request, in an embodiment, is a web API request. In an embodiment, the authorization service 304 parses the request and determines that the requestor (e.g., a user associated with a security token provided by the client computer system in connection with the request) has sufficient permissions and fulfills the request by granting access to the computing resource 306. In an embodiment, access to a computing resource 306 includes some or all of: running executable code on the computing resources (e.g., arbitrary code provided by the requestor), manipulating and/or reading data stored by the computing resource service provider, and more.

In an embodiment, metadata associated with the request is recorded in one or more logs 308. In an embodiment, a logging system comprises storage and/or compute resources that record information related to the processing and/or fulfillment of requests. In an embodiment, the logs 308 are stored in a structured format, such as in the form of records of a database table. In an embodiment, the recorded metadata includes the principal (e.g., user) associated with the request, the action performed (e.g., the web API made by the requestor), and one or more computing resource utilized in fulfilling the request. In an embodiment, the logging system records activity data associated with the request synchronously (e.g., as part of the fulfillment of the request) or asynchronously (e.g., the request spawns a low-priority request to write activity data to the logs that is asynchronously processed relative to the client request). In an embodiment, a logging service comprises a fleet of databases across multiple locales that are used to record activity data.

At a second point in time $t_2$ after $t_1$, in an embodiment, an access management service 312, such as those described in connection with FIG. 1, performs a process to dynamically adapt user policies. In an embodiment, the access management service includes executable code that, as a result of execution, causes one or more processors of a computer system to request activity data from an access monitor service 310. In an embodiment, the access monitor service 310 receives the request and aggregates activity data of a plurality of logs into an ordered format (e.g., chronological or reverse-chronological order) and provides the ordered activity data to the access management service 312. In an embodiment, the access management service 312 obtains access adjustment parameters associated with a principal and utilizes the activity data to determine whether to generate a deny policy 314. In an embodiment, the access adjustment parameters are implemented in accordance with those described in connection with FIGS. 1 and 2, and 7. In an embodiment, the access management service 312 determines that the computing resource 306 has not been accessed by the user (e.g., user associated with the client computer system 302) within a predetermined period of time, and in response to making such a determination, applies a deny policy to revoke access to the computing resource 306. In an embodiment, activity data is obtained over a time interval that is specified in the parameters or calculated based at least in part on the parameters.

A deny policy 314, in an embodiment, is a security policy that comprises one or more policies that, as a result of being applied (e.g., by a policy management service) causes the loss of access to the functionality of one or more aspects of a computing resources service provider. In an embodiment, the deny policy is generated in accordance with techniques described elsewhere in this disclosure. In an embodiment, at time $t_2$, an administrator issues a request to the authorization service 304 to apply the deny policy 314 to a user account based at least in part on determining that one or more actions or computing resources were not exercised and/or one or more security permissions were not exercised in the fulfillment of requests during a specified time period (e.g., over the past X days).

In an embodiment, at a third time $t_3$ after $t_2$, the client computer system 302 makes a second request to access the computing resource 306. The second request, in an embodiment, is the same type of request as the initial request made at $t_1$ (e.g., the same API command). In an embodiment, the authorization service 304 receives the second request but, unlike the first request, does not fulfill the request due to the deny policy that was applied at time $t_2$. Accordingly, in this way, access adjustment parameters are utilized to remove a user's access to computing resources that were previously accessible, in accordance with one embodiment.

Figure 4:
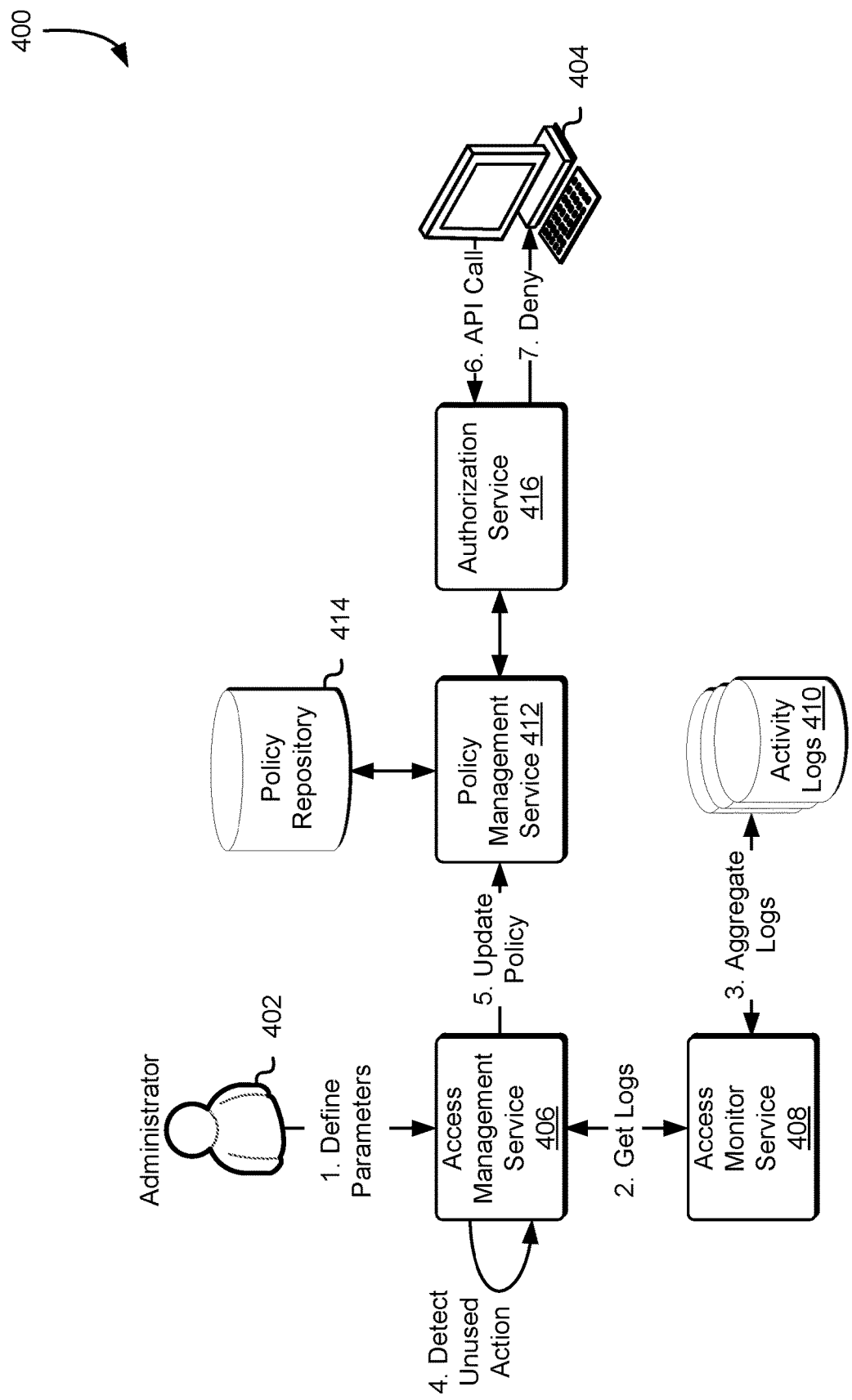
FIG. 4 illustrates a system that implements an access management routine wherein a requestor is denied access to a computing resource, in accordance with an embodiment.

FIG. 4 illustrates a diagram of a system 400 in which an embodiment in accordance with this disclosure is implemented. In an embodiment, an administrator 402 defines parameters that are utilized to adaptively control the security permissions of a user 404. In an embodiment, the adaptive policies result in the denial of access to computing resources to a user. In an embodiment, FIG. 4 illustrates an access adjustment routine.

In an embodiment, an administrator 402 refers to a computing entity that, on behalf of an administrator of an organization, specifies a set of adaptive parameters that are usable to monitor and modify the access permissions of a principal (e.g., a user) over time. In an embodiment, the adaptive parameters are access adjustment parameters such as those described in connection with FIG. 7. In an embodiment, the administrator 402 provides the adaptive parameters to an access management service 406 of a computing resource service provider and the access management service 406 stores the adaptive parameters in a database table and determines whether to modify a user's permissions based on the adaptive parameters (e.g., per user) on a periodic basis. In an embodiment, users' permissions are modified in response to a command (e.g., a web API request submitted by an administrator on an ad hoc basis).

In an embodiment, the access management service 406 submits a query to an access monitor service 408 to obtain activity data. In an embodiment, the query is specific to a user or a set of users (e.g., the query is generated based at least in part on access adjustment parameters associated with a particular user). In an embodiment, the query requests activity data regardless of the user performing the activity (e.g., the query is generated first and then the access adjustment parameters stored in a database are enumerated).

In an embodiment, the access monitor service 408 is a service of a computing resource service provider that aggregates activity data from a plurality of data sources, such as a plurality of activity logs 410 as illustrated in FIG. 4. In an embodiment, the access monitor service 408 obtains data from multiple regions or compute zones, which may be organized geographically (e.g., there may be different compute zones by country, continent, or geographical proximity) and aggregates the data from the multiple regions into an ordered set. The access monitor service 408, in an embodiment, provides the aggregated data to the access management service 406 in any suitable manner, such as by providing the data directly (e.g., in a data structure that is transmitted to the access management service 406) or indirectly (e.g., providing a uniform resource identifier (URI) usable to obtain the aggregated data).

In an embodiment, the activity data is aggregated into an ordered data structure in chronological order. In an embodiment, the activity data obtained is a list of all actions performed by a particular user within a specified time period, which may include the most recent activities a user has performed within the past N minutes, past X days, and so on. In an embodiment, retrieval of activity data is optimized and/or expedited by utilizing one or more databases sorted and/or filtered to include only requests associated with the user that have a request timestamp between a start time and end time. In an embodiment, activity data is obtained based on request context information, such as network addresses (e.g., IP addresses) that the user has previously made requests from, by obtaining unique network addresses associated with the user (e.g., in connection with a time interval as described above). In an embodiment, obtaining network addresses associated with a user is obtained from a database by seeking to a first row associated with a first request having a first network address, recording the first network address to a data structure, seeking past other rows having the same first network address and to a second row associated with a second request having a second network address different from the first address, recording the second network address to the data structure, and repeating to fill the data structure with network addresses that the user has utilized to make previous requests. In an embodiment, other types of request context information such as the time of day of requests and tags associated with requested resources can be filtered and aggregated in the manner described above. In an embodiment, statistical-based techniques are utilized to probabilistically obtain activity data. In an embodiment, the user's requests conform to a probability distribution based on a particular variable, and additional authentication is requested for when the variable is outside of a particular distribution range (e.g., beyond two standard deviations). In an embodiment, the rate or frequency in which a user access computing resources of a computing resource service provider is modeled as a Gaussian distribution.

The access management service 406, in an embodiment, utilizes activity data to detect unused actions and/or resources. In an embodiment, the adaptive parameters encodes information usable to determine a user, an action, and an age threshold wherein the access management service 406 obtains activity data for the user that was performed within the age threshold and determines, based on the activity data, whether the action was performed. In an embodiment, a deny policy is generated in response to determining that the action was not exercised within the age threshold, and the deny policy is submitted to a policy management service 412 and the policy management service applies the deny policy to the user and persists the update to a policy repository 414. It should be noted that while a deny policy is discussed in this context, in an embodiment, a policy with an effect to grant access to resources may be generated and replaces an existing security policy, wherein the generated policy has the effect of denying access to the unused action (e.g., the generated policy does not grant access to perform the action whereas the original policy did).

In an embodiment, a client computer system 404 submits a request to perform the action after the deny policy has been applied, the authorization service 416 evaluates the applicable security policies by querying the policy management service 412 for the user's policies, determines that the received policy is not sufficient to grant access to fulfill the request, and provides an indication of nonfulfillment of the request (e.g., denies the request).

Figure 5:
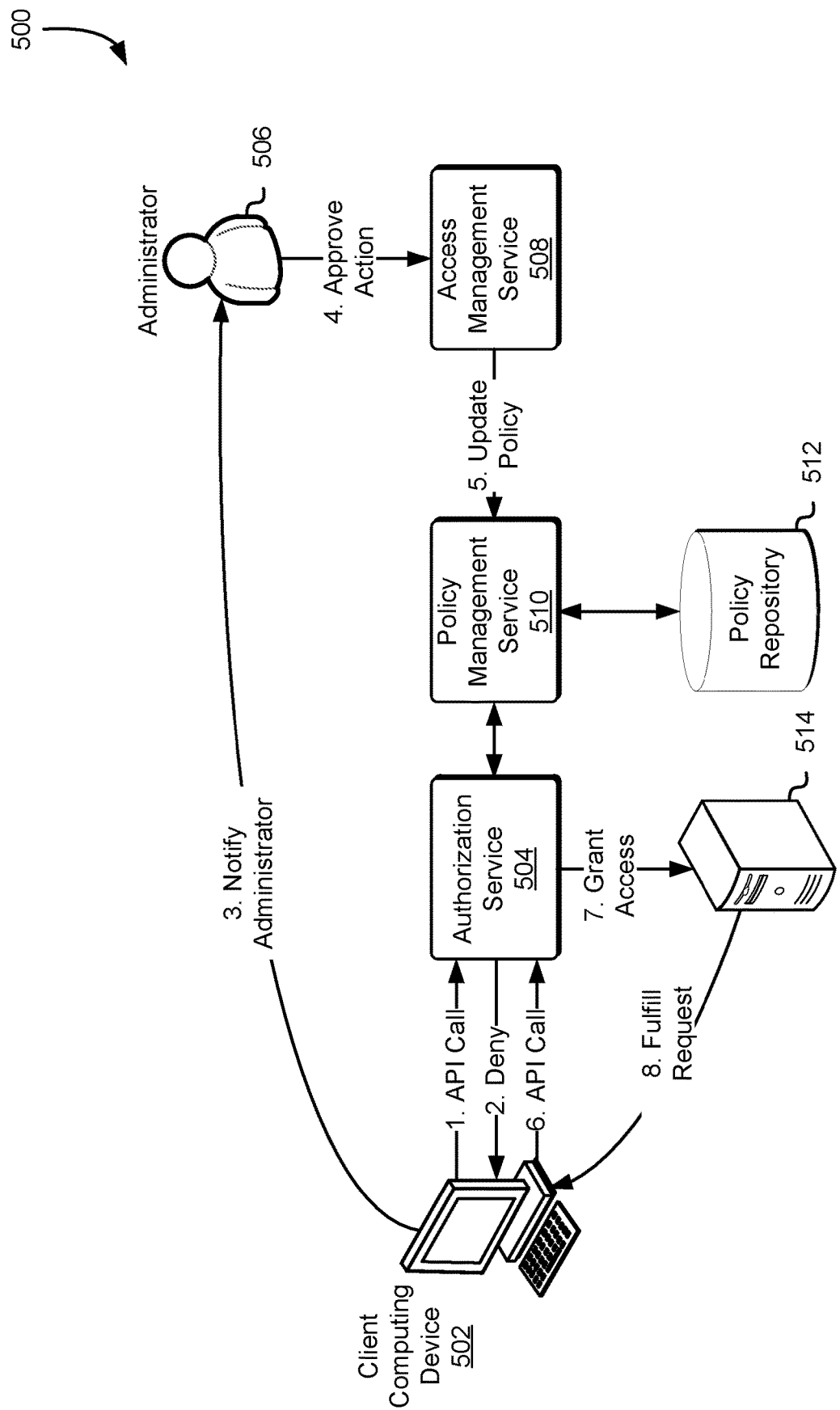
FIG. 5 illustrates a system that implements an access management routine wherein access to a computing resource is restored, in accordance with an embodiment.

FIG. 5 illustrates a diagram of a system 500 in which an embodiment in accordance with this disclosure is implemented. In an embodiment, a client computing device 502 is initially denied permissions to perform an action (e.g., as a result of applying the access adjustment techniques described in connection with FIG. 4) and later granted permission to perform the action. In an embodiment, systems and techniques described in connection with FIG. 5 are coextensive with embodiments described in connection with FIG. 4.

A client computing device 502 associated with a user, in an embodiment, submits an API call (e.g., a web API request) to a computing resource service provider and the request is routed to an authorization service 504 to determine whether and/or how to fulfill the request. In an embodiment, the request is a request to access a computing resource or a set of computing resources. In an embodiment, the authorization service 504 receives the request, and obtains one or more security policies applicable to the request via the policy management service 510. In an embodiment, the applicable policies to the request are evaluated by the authorization service 504 and the authorization service 504 determines that the request should not be fulfilled and provides an indication to the user (e.g., via a response to a web API request) that the request is denied. In an embodiment, the authorization service determines to deny the request based on a deny policy that was previously generated and applied to the user's account as the result of an access adjustment routine, such as in the manner described elsewhere in this disclosure such as in connection with FIGS. 1 and 4. In an embodiment, the user's access to perform the API call was revoked based on the user having failed to exercise the API over a time duration specified in a set of access adjustment parameters that an administrator 506 assigned to the user.

In an embodiment, the client computing device 502 receives an indication that the initial request was denied. In an embodiment, the denial is implied (e.g., no response to the request is received by the client). In an embodiment, the client computing device 502 receives, for the user, a response to the request including an indication that the request was denied. The response, in an embodiment, includes information indicating that the reason the request was denied was due to an access revocation arising from an access adjustment routine. Regardless, in an embodiment, the user determines that the initial request was denied and notifies an administrator 506 that the request failed. In an embodiment, the user notifies the administrator 506 by transmitting an electronic message from the client computing device to a computing device of the administrator 506. In an embodiment, a client library includes executable code that, if executed by one or more processors of the client computing device 502, causes the client computing device to automatically transmit an electronic notification to a service frontend of a computing resource service provider in response to receiving the indication that the request was denied and the service frontend routes an appropriate notification (e.g., performing one or more transformations on the received notification) to a computing device associated with an administrator. In an embodiment, the client library refers to executable code that is provided to the client by the computing resource service provider. In an embodiment, the electronic notification is transmitted to the administrator by the authorization service 504. In an embodiment, an administrator 506 receives a notification that the user has requested a restoration of access to perform the API call and approves the restoration of access via a console that controls the access management service 508 (e.g., a command line interface and/or graphical user interface). In an embodiment, the access management service 508 updates a security policy of the user by submitting a request to the policy management service 510 to delete or remove a deny policy that was previously generated as part of an access adjustment routine. In an embodiment, the access management service 508 updates the security policy of the user by modifying an existing policy to include a grant of access to an action or computing resource that was previously removed as part of an access adjustment routine.

In an embodiment, the user receives a notification that access to an action and/or computing resource was restored and the user uses the client computing device 502 to re-submit the same request, which the authorization service 504 allows to be fulfilled based on the restoration of access. Accordingly, in an embodiment, access to computing resources 514 required to fulfill the request is granted and the request is fulfilled in connection with the use of the computing resources 514.

In an embodiment, the authorization service 504 determines that denial of the initial request was a result of a policy change caused by an access adjustment routine (e.g., that the API request would have been fulfilled if there had not been a deny policy generated by an access adjustment routine). In an embodiment, the user receives, at the client computing device 502, a visual indication (e.g., via a graphical user interface) that the request was denied due to inactivity and an option to request that access be restored is presented to the user wherein, upon selecting the option, the client computing device 502 transmits a restoration request to the computing resource service provider that is routed to the access management service 508 (e.g., via the authorization service 504) where the restoration request is queued alongside other such restoration requests. In an embodiment, the restoration queue includes, for each restoration request, a request context that includes information such as the API call that was denied and additional context usable to re-submit the initial request. In an embodiment, the administrator access the restoration queue via a graphical user interface and can select which restoration requests should be granted and which should be denied—a restoration request can be granted as described above, and a restoration request can be denied by maintaining a deny policy.

In an embodiment, when an administrator grants a restoration request, the access management service 508 submits a request to the policy management service 510 to update the security policy of the user, and, in response to receiving an indication that the policy was updated, the access management service re-submits the initial request on behalf of the user (e.g., by assuming the role of the user) by obtaining the request information and request context from the restoration queue. Security policies, in an embodiment, are stored in a policy repository 512 as illustrated in FIG. 5 and implemented in accordance with those described in connection with FIG. 2. In an embodiment, an administrator grants a one-time or limited (e.g., for a limited number of requests and/or limited duration) approval to fulfill requests in response to receiving notification and a subsystem such as the access management service 508 processes such an approval by evaluating that the conditions for granting access are satisfied (e.g., whether the request conforms to the limited approval based on the request time and/or number of requests made by the requestor), assuming a role having permissions associated with the user's permissions prior to the user's permissions being adjusted as part of an access adjustment routine, and processes the request under the assumed role. In an embodiment, storage and retrieval of such prior permissions is managed by the access management service 508 and/or the policy management service 510 in connection with a data storage system.

Figure 6:
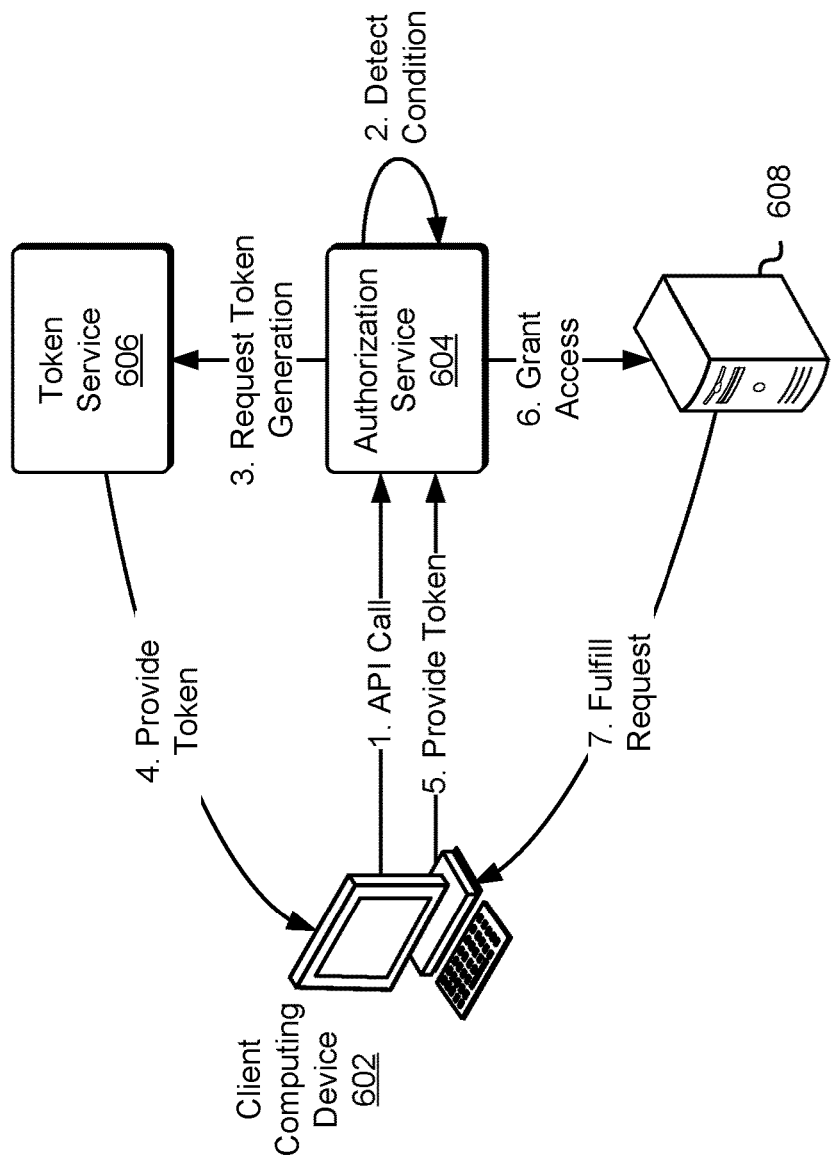
FIG. 6 illustrates a system that implements an access management routine wherein access to a computing resource is restored, in accordance with an embodiment.

FIG. 6 illustrates a diagram of a system 600 in which an embodiment in accordance with this disclosure is implemented. In an embodiment, a client computing device 602 is initially denied permissions to perform an action (e.g., as a result of applying the access adjustment techniques described in connection with FIG. 4) and later granted permission to perform the action in conjunction with obtaining and presenting a security token.

A client computing device 602 associated with a user, in an embodiment, submits an API call (e.g., a web API request) to a computing resource service provider and the request is routed to an authorization service to determine whether and/or how to fulfill the request. In an embodiment, the request is a request to access a computing resource or a set of computing resources. In an embodiment, the submission of the initial request and/or the indication that the request is denied are in accordance with embodiments described in connection with FIGS. 1, 4, and 5.

In an embodiment, the authorization service 604 is a service of a computing resource service provider that is hosted on a fleet of servers and includes executable code that, if executed, causes one or more processors of the fleet of servers to evaluate one or more applicable security policies to determine whether to fulfill the request. In an embodiment, the user's security policy is modified in a manner that makes fulfillment of the request dependent upon additional authentication information. In an embodiment, the authorization service 604 detects a condition on the user's security policy (e.g., user's security policy obtained from a policy management service) for fulfilling the request, wherein the condition is based at least in part on contextual information regarding the requestor's access patterns, such as temporal information (e.g., whether the request is made outside of normal business hours) and/or location information (e.g., whether the request is made from a location that the user has not previously accessed the service from). In an embodiment, the condition is applied to the user's security policy as part of an access adjustment routine.

In an embodiment, the authorization service 604 detects an applicable condition wherein additional authentication is indicated, and performs an authentication process by requesting that a token service 606 generate a token for the user. In an embodiment, a token service 606 is a service of a computing resource service provider and is used to perform operations related to the management of security tokens. The token service 606, in an embodiment, generates a security token (e.g., a keyed-hash message authentication code) in response to a request. In an embodiment, the security token includes data that indicates the user, the request that was denied, and an indication that the request is allowable in association with the token, wherein the information is provided as an input to a cryptographic hash function (e.g., thereby generating the HMAC) and cryptographically verifiable. The token service may further have access to a cryptographic key that may be used for generating HMACs. However, in other embodiments, the separate cryptography service may be used to generate HMACs. An HMAC may be generated using various one-way hash functions such as a secure hash algorithm (e.g., SHA-256 algorithm). In an embodiment, the token service 606 provides a token to the client computing device 602 on behalf of the authorization service 604. In an embodiment, the token service 606 provides the token to the client via a different computing device associated with the client user such as a one-time code that is sent to a cellular phone that was previously registered to the user. In an embodiment, the client must provide additional authentication in order to receive the token from the token service 606 and the additional authentication can be in accordance with various multi-factor authentication techniques. In an embodiment, a push mechanism is utilized to provide the token to the client.

In an embodiment, the user receives, at the client computing device 602, the token and provides the token to the authorization service 604 (perhaps with additional context information associating the token to the initial request) and the authorization service 604 validates the received token (perhaps delegating the validation to the token service 606). In an embodiment, the token is validated by utilizing a public key to verify a digital signature encoded in the token. In an embodiment, the digital signature is an attestation that the initial request should be fulfilled. In an embodiment, the authorization service 604, in response to successfully validating the token, provides access to a computing resource 608 usable to fulfill the request and the computing resource 608 is utilized to fulfill the request. In an embodiment, the client computing device 602 receives a response to the request indicating successful fulfillment of the request.

It should be noted that in an embodiment, an initial request is routed to an authorization service 604 that determines, based on one or more security policies associated with the user, that the initial request should not be fulfilled and indicates to the client computing device 602 that the request is denied, and that, upon submitting a subsequent request with a security token (e.g., provided to the user by the token service 606), that the subsequent request is fulfilled after the authorization service 604 validates the security token provided in association with the subsequent request (e.g., the token is encoded in the subsequent request).

Figure 7:
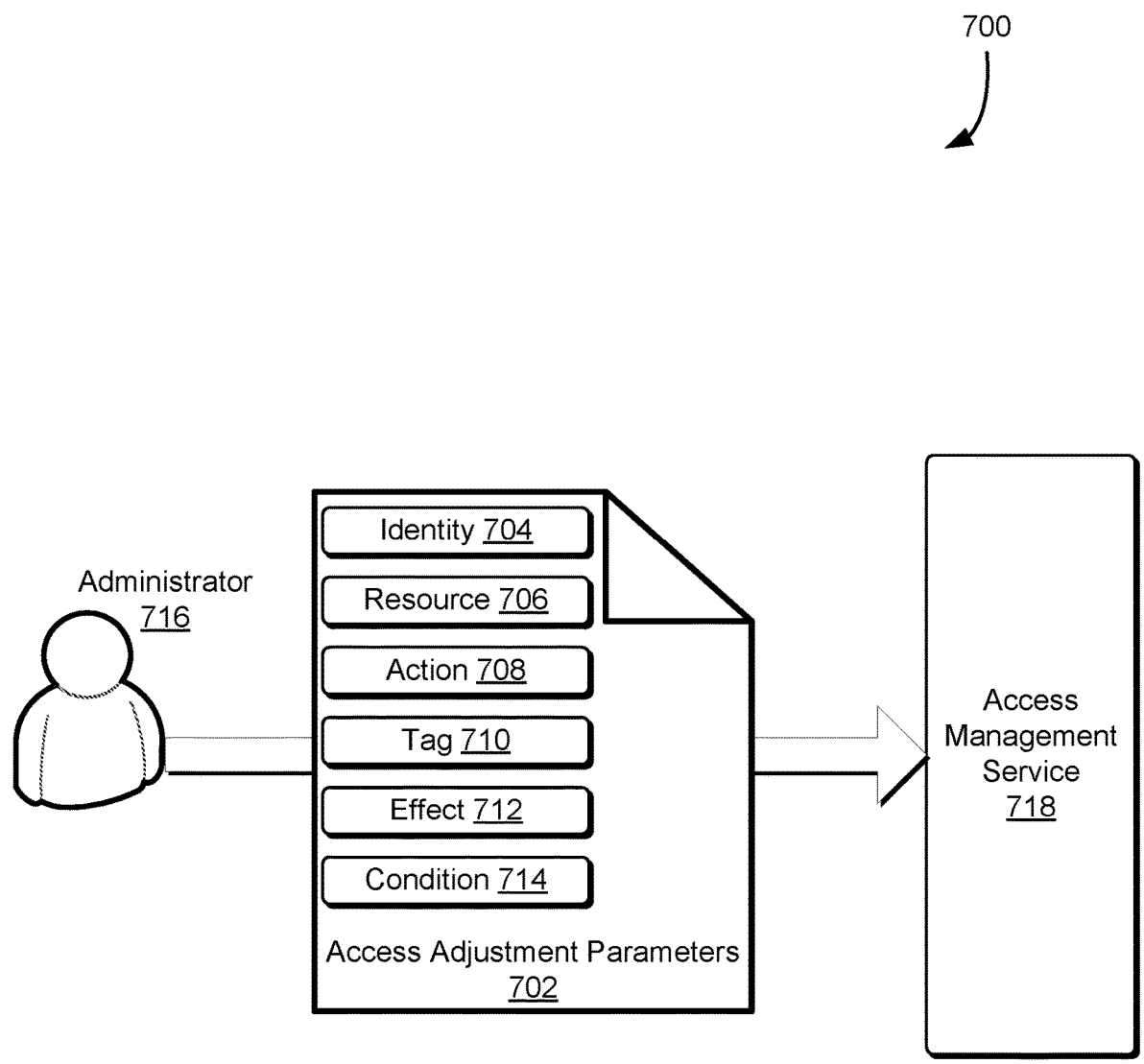
FIG. 7 illustrates a diagram of access adjustment parameters, in accordance with an embodiment.

FIG. 7 illustrates a diagram of a system 700 in which an embodiment in accordance with this disclosure is implemented. In an embodiment, an administrator 716 provides access adjustment parameters 702 to an access management service 718 as part of a request. In an embodiment, the system 700 illustrated in FIG. 7 is implemented in accordance with systems and techniques described in connection with FIGS. 1 and 2.

In an embodiment, access adjustment parameters 702 refers to data that defines a set of conditions and a set of rules that, if applied, causes a principal to lose access to functionality of a computing resource service provider. In an embodiment, loss of functionality refers to losing access to a computing resource—for example, a request for access to and/or utilization of the computing resource is denied. In an embodiment, access. In an embodiment, loss of functionality refers to losing the ability to perform certain actions—for example, a particular web API request is not fulfilled. In an embodiment, access to a computing resource refers to the ability to perform various operations on the computing resources, such as the ability to create, read, update, and/or delete data associated with the computing resource. In an embodiment, access refers to the ability to cause fulfillment of API requests to perform various actions such as migrating data, listing and/or enumerating and/or manipulating hierarchical data (e.g., objects logically stored in a container), and combinations thereof. In an embodiment, the access adjustment parameters 702 are provided by an administrator 716 to an access management service 718 as part of a request. In an embodiment, the access adjustment parameters are specified by the administrator as part of the creation of a user account.

In an embodiment, an identity 704 is encoded in the access adjustment parameters. In an embodiment, the identity refers to one or more principals (e.g., users and groups) that the access adjustment parameters are associated with. In an embodiment, the identity 704 includes a resource name associated with a principal. In an embodiment, the principal is a user having a set of associated permissions to resources and/or actions that are specified in a security policy. In an embodiment, the access management service 718 uses the identity 704 to generate a query to obtain activity data attributed to the user associated with the identity 704. In an embodiment, the identity 704 is a list of resource name identifiers.

In an embodiment, the access adjustment parameters comprise identifiers for one or more computing resources 706. In an embodiment, the computing resources 706 indicated in the access adjustment parameters refers to a set of computing resources that the one or more principals encoded in the identity 704 lose access to as a result of the one or more conditions 714 being satisfied. In an embodiment, the access adjustment parameters comprise identifiers for one or more actions 708. In an embodiment, the actions 708 indicated in the access adjustment parameters refer to a set of actions (e.g., web APIs) that the one or more principals encoded in the identity 704 lose access to as a result of the one or more conditions 714 being satisfied. In an embodiment, the access adjustment parameters encode a set of computing resource, a set of actions, or a combination thereof.

In an embodiment, the access adjustment parameters comprise one or more tags 710. In an embodiment, a tag refers to a logical association of computing resources, actions, and the like. In an embodiment, a tag identifies a set of resources and commands that the user is expected to use in connection with a set of responsibilities within an organization—for example, a tag is associated with a particular project and a set of resources and commands that an engineer is expected to use or may need to use as part of her engineering responsibilities within an organization, such as access to compute instances (e.g., virtual computer systems), data storage systems, and API commands to control such systems. In an embodiment, access for resources associated with a tag are revoked in response to determining that no resources and/or actions associated with the tag are accessed under the one or more conditions 714 specified. In an embodiment, a tag comprises compute resources (e.g., a virtual computer system) and data storage resources, and access to the compute resources or the data storage resources is sufficient to prevent the revocation of all resources and actions associated with the tag.

In an embodiment, the access adjustment parameters comprise an effect 712. In an embodiment, an effect refers to allowing or denying access, which is indicated using a Boolean or enumerated field. In an embodiment, an effect such as a deny effect encodes a contingent condition upon which the effect is enforced—for example, upon the time of day. In an embodiment, the effect 712 defines a contingent condition that access to resources and/or actions are denied unless the user provides an additional security token as part of a multi-factor authentication process, such as by utilizing techniques and systems described in connection with FIG. 6.

In an embodiment, one or more conditions 714 of the access adjustment parameters define a set of binary conditions that are can be evaluated to a true or false result indicating whether access should be revoked. In an embodiment, the conditions 714 determine the criteria for revoking access to a resource or action, whereas other data encoded in the access adjustment parameters indicates how and/or what resources and actions are to be revoked via a deny policy. In an embodiment, a condition is based on the time of day during which access should be revoked (e.g., outside of normal business hours). In an embodiment, a condition is based on the location of the requestor such as is determined based on the IP address of the request for which access should be revoked (e.g., an IP that a request has not previously been received from, an unexpected geolocation based on the user's previous communication patterns).

Figure 8:
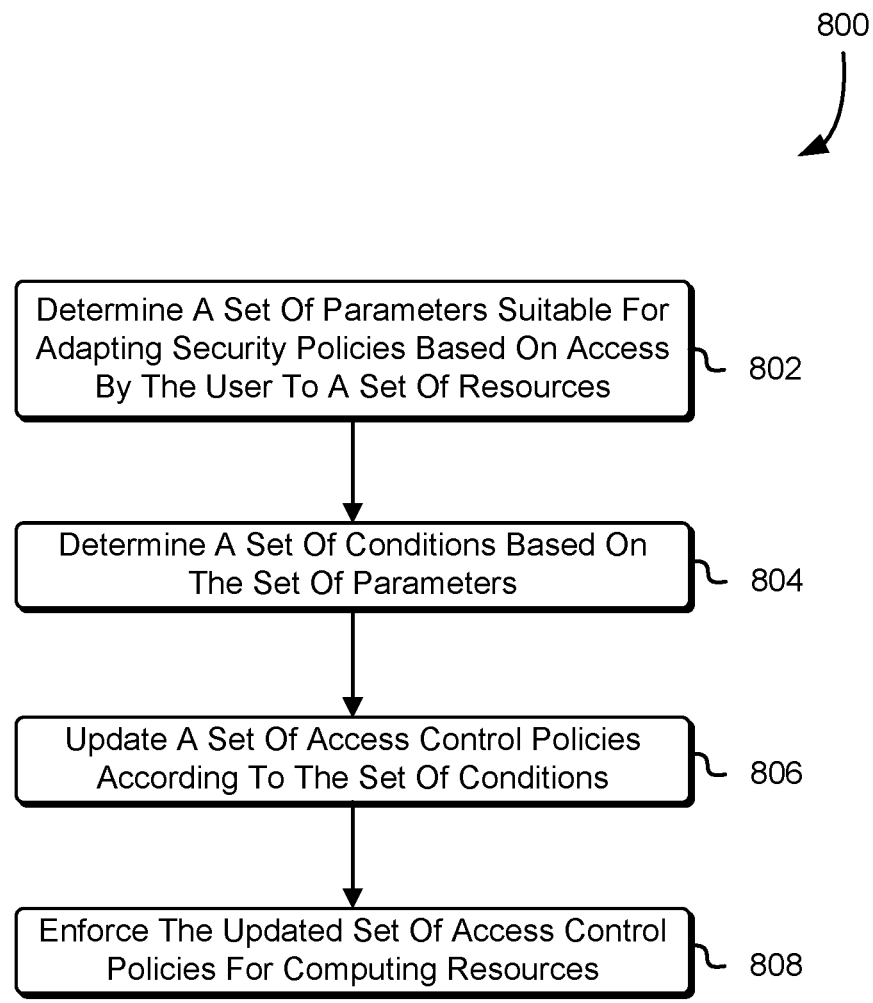
FIG. 8 illustrates process for managing access to computing resources, in accordance with one embodiment.

FIG. 8 illustrates process 800 for managing access to computing resources of a computing resource service provider, in accordance with one embodiment. The process 800, in an embodiment, is implemented using hardware, software, or a combination thereof. In an embodiment, the process is implemented in accordance with at least one of FIGS. 1-7, 10, and 11 as described herein. In an embodiment, a computer system performing the process receives, obtains, or otherwise determines 802 a set of parameters for a user based at least in part on access by the user to a set of resources. In an embodiment, the system uses a set of access logs to determine the set of parameters. The set of parameters, in an embodiment, are in accordance with other embodiments such as those discussed in connection with FIGS. 1-7 and 9-11.

In an embodiment, the system defines 804, identifies, obtains, or otherwise determines a set of conditions based at least in part on the set of parameters. In an embodiment, the set of conditions are defined such that satisfaction of the set of conditions indicates consistency with previous requests to access resources. In an embodiment, the conditions are based at least in part on the context in which previous requests to access resources were made by the user, such as the time of day (e.g., during or outside of business hours), network location (e.g., IP address information), geographical location (e.g., based on GPS information), and more. The set of conditions, in an embodiment, are in accordance with other embodiments such as those discussed in connection with FIGS. 1-7 and 9-11. In an embodiment, the context information is usable to determine a set of parameters that is a superset of the context information. In an embodiment, if a user has previously submitted requests from a known geographical location, then the set of parameters include a larger region that encompasses the known location (e.g., if the context information is resolved to a request originating from a town or city, the superset is the entire state). Likewise, in an embodiment, if a user has previously submitted requests from a particular IP address or a range of IP addresses, the IP address or range of IP addresses is used to determine a set of IP addresses that includes the IP addresses the user has previously used to submit requests.

The system, in an embodiment, utilizes the set of conditions to update a set of access control policies. In an embodiment, the system updates 806 the set of access control policies associated with the user according to the set of conditions such that if a request by the user to access a particular computing resource fails to satisfy the set of conditions, fulfillment of the request involves additional authentication. In an embodiment, fulfillment of the request is contingent upon receiving additional authentication information. The set of access control policies, in an embodiment, are in accordance with other embodiments such as those discussed in connection with FIGS. 1-7 and 9-11. In an embodiment, the set of conditions are utilized to update the set of access control policies in a manner that denies access to computing resources, grants access to computing resources, and makes access to computing resources contingent upon an additional condition, such as receiving additional authentication information from the user, receiving an authorization from an administrator, and more.

The system, in an embodiment, enforces 808, either directly or indirectly, the set of access control policies for the set of resources described above. In an embodiment, the updated access control policies are applied to a policy management service and the updated policies are applied to subsequent requests by the user by an authorization service, such as those described elsewhere in disclosure in connection with FIG. 2.

Figure 9:
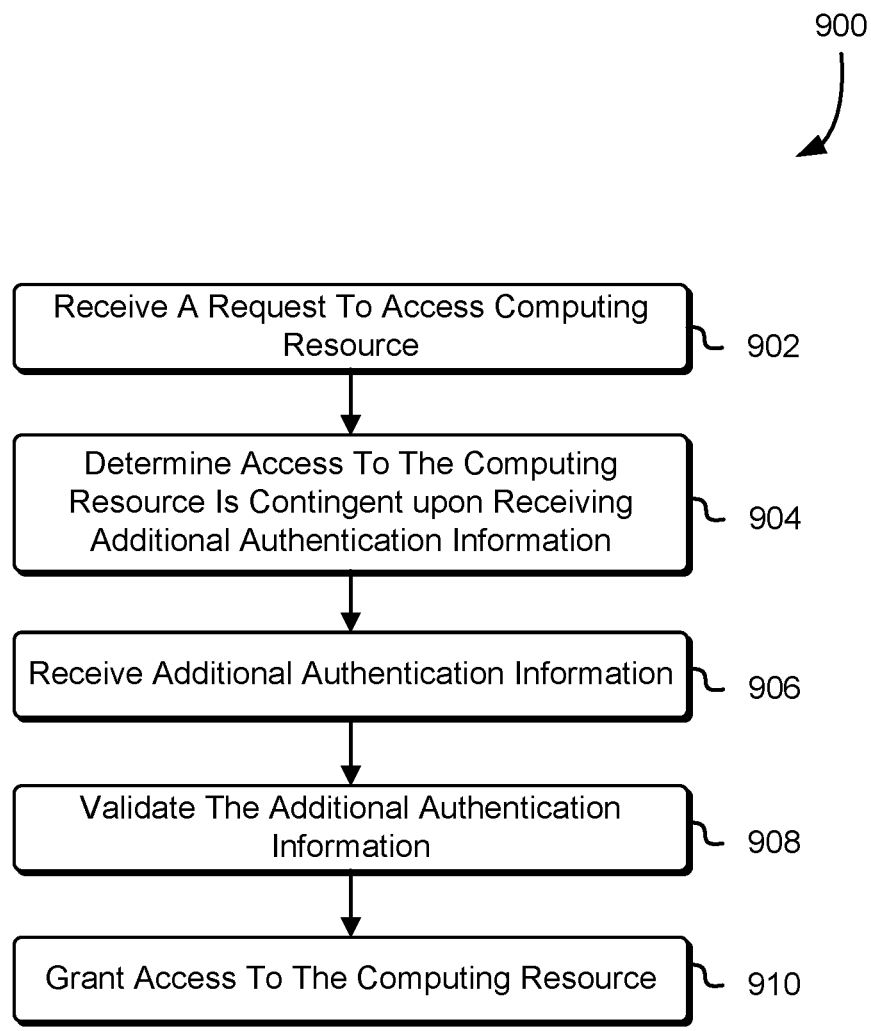
FIG. 9 illustrates process for granting access to computing resources of a computing resource service provider contingent upon additional authentication information, in accordance with one embodiment.

FIG. 9 illustrates process 900 for managing access to computing resources of a computing resource service provider, in accordance with one embodiment. The process 900, in an embodiment, is implemented using hardware, software, or a combination thereof. In an embodiment, the process is implemented in accordance with at least one of FIGS. 1-7, 10, and 11 as described herein. In an embodiment, a computer system performing the process receives 902 a request to access computing resources as part of a web API request. In an embodiment, the API request is authenticated and authorized. In an embodiment, the system determines 904 that access to the computing resource is contingent upon receiving additional authentication information from the requestor. In an embodiment, an acceptable form of additional authentication includes a multi-factor authentication. In an embodiment, the requestor receives a one-time use token for the request that expires after a predetermined time period. In an embodiment, the requestor provides and the system receives 906 the additional authentication information, validates 908 the additional authentication information using techniques described herein such as in connection with FIG. 2, and grants access 910 to the computing resource by fulfilling the request. In an embodiment, the system denies the initial request and the token is used to fulfill a subsequent request to gain access to the computing resource, such as a re-try by the same requestor or by the system using a cached request that is fulfilled upon receipt of the additional authentication information.

Figure 10:
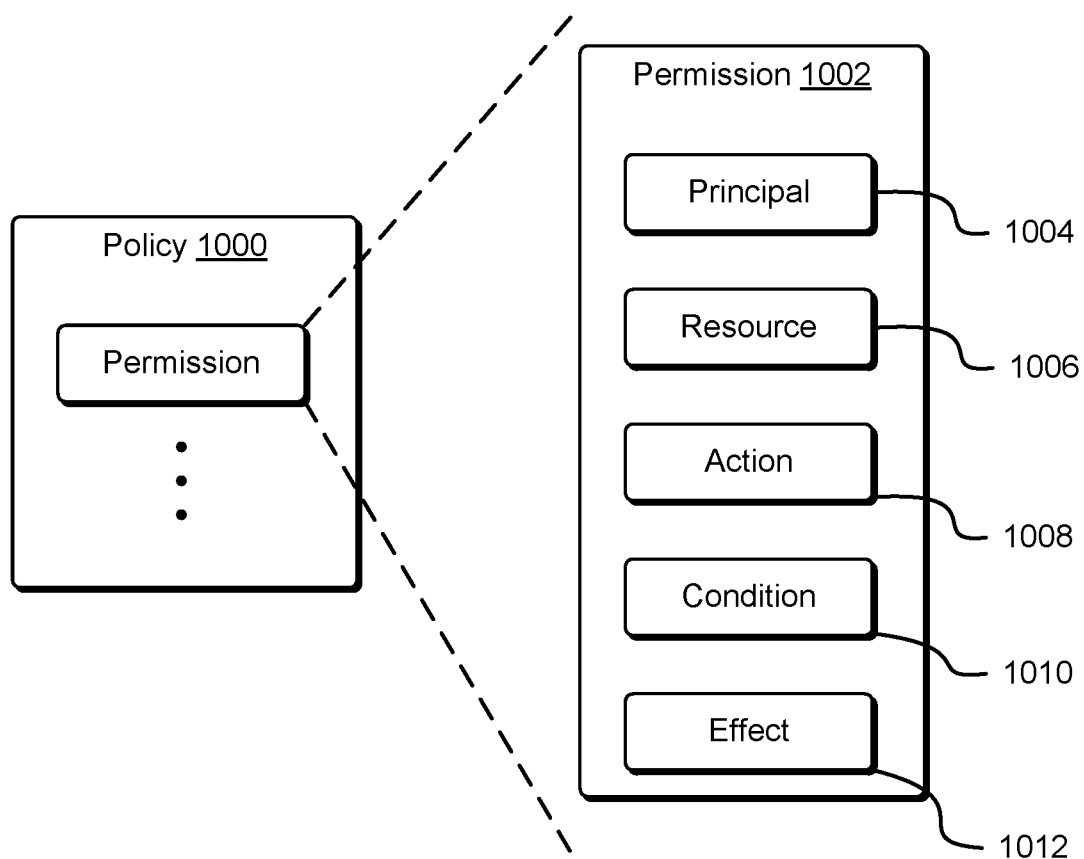
FIG. 10 illustrates a policy, in accordance with one embodiment.

FIG. 10 illustrates an example of a security policy (also referred to as a policy or user policy) 1000 comprising a set of security permissions (also referred to as permissions). A policy 1000, in an embodiment, is associated with one or more principals and is usable (e.g., by an authorization service) to evaluate whether a request associated with a particular user or group should be fulfilled. In an embodiment, a permission 1002 specifies a principal 1004, a resource 1006, an action 1008, a condition 1010, and an effect 1012. In some embodiments, a permission 1002 may also specify a plurality of one or more of these elements such as, for example, a set or class of users, a collection of resources, several different actions, and/or multiple conditions. In some embodiments, the permission 1002 may specify one or more wildcard or otherwise modifiable characters that may be used to denote that the permission 1002 may be modified to make the permission 1002 applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal 1004 may be a user, a group, an organization, a role, or a collection and/or combination of these or other such entities. A principal 1004 may be any entity that is capable of submitting API calls that cause an action associated with a resource to be performed and/or any entity to which permissions associated with a resource may be granted. As an example, a permission 1002 may have a principal 1004 element specified in the following manner:

"Principal": "rn:ws:iam::ducksfan8"

In some embodiments, the principal 1004 is identified by a resource name that uniquely identifies the principal 1004. A principal 1004 may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "ducksfan8")—in some formats and/or for some resources, a region namespace may be option; and "ducksfan8" may refer to an identifier for the account, such as the account that owns the resource 1006 specified in the permission 1002.

The resource 1006 may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources 1006 may be organized in a hierarchy, and may use structures such as folders, directories, buckets, etc. to organize sets of computing resources into groupings. In some cases, policies and/or permissions may be applied directly to a bucket and grant cross-account access to an environment. As an example, a permission 1002 may have a resource 1006 element specified in the following manner:

"Resource": "rn:ws:storage:::bucket/MM4_Heisman.png"

In some embodiments, the resource 1006 is identified by a resource name that uniquely identifies the resource 1006. In some cases, the resource 1006 may share a same naming convention as the principal 1004 or other elements of the permission. However, this need not be the case, as each separate element of a permission 1002 may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

The action 1008 may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission 1002 may have an action 1008 element specified in the following manner:

"Action": "storage:GetObject"

In this example, the action that is allowed or denied (determined based on the effect 1012 specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition 1010 element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action 1008 element. As an example, a permission 1002 may have a condition 1010 element specified in the following manner:

"Condition": {"DateLessThan": {"ws:CurrentTime": "2014-12-13"}}

In this example, the condition, the "ws:CurrentTime" value of the request is compared against a literal value "10104-12-13" using the condition operator "DateLessThan" which may be used to evaluate whether the condition is met. In this example, the condition may be true when the current time (e.g., the time the request is received by the service provider) is less than the supplied date of Dec. 13, 2014. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys.

An effect 1012 may refer to whether the permission 1002 is used to grant or deny access to the computing resources specified in the permission 1002 in the resource 1006 element. An effect 1012 may be an ALLOW effect, which grants access to a resource, and a DENY effect, which denies access to a resource. In some embodiments, access to computing resources of a computing resource service provider are denied by default and a permission affirmatively including an ALLOW effect is required. In an embodiment, a policy that includes an affirmative "DENY" for a computing resource supersedes any other permissions that would otherwise ostensibly grant access to the computing resource (e.g., if a container of an object has a corresponding policy with an "ALLOW" effect that is inherited by objects of the container and the object has a "DENY" effect, access to the object would be denied). As an example, a permission 1002 may have an effect 1012 element specified in the following manner:

"Effect": "ALLOW"

Accordingly, a permission statement that grants a particular principal (e.g., "rn:ws:iam::ducksfan8") access to call a storage service API (e.g., "storage:GetObject") and obtain a particular image (e.g., "rn:ws:storage:::bucket/MM4_Heisman.png") when a specific condition is true (e.g., the API request is made prior to Dec. 13, 2016) may be specified in the following manner:

"Statement": [
{
  "Effect": "ALLOW",
  "Principal": "rn:ws:iam::ducksfan8",
  "Action": "storage:GetObject",
  "Resource": "rn:ws:storage:::bucket/MM4_Heisman.png",
  "Condition": {
    "DateLessThan": {
      "ws:CurrentTime": "2014-12-13"
    }
  }
}
]

It should be noted that the examples described above merely described one of many ways in which permissions may be expressed. Of course, in other embodiments, variations on the principles described above in connection with FIG. 10 may be applied in various ways.

Figure 11:
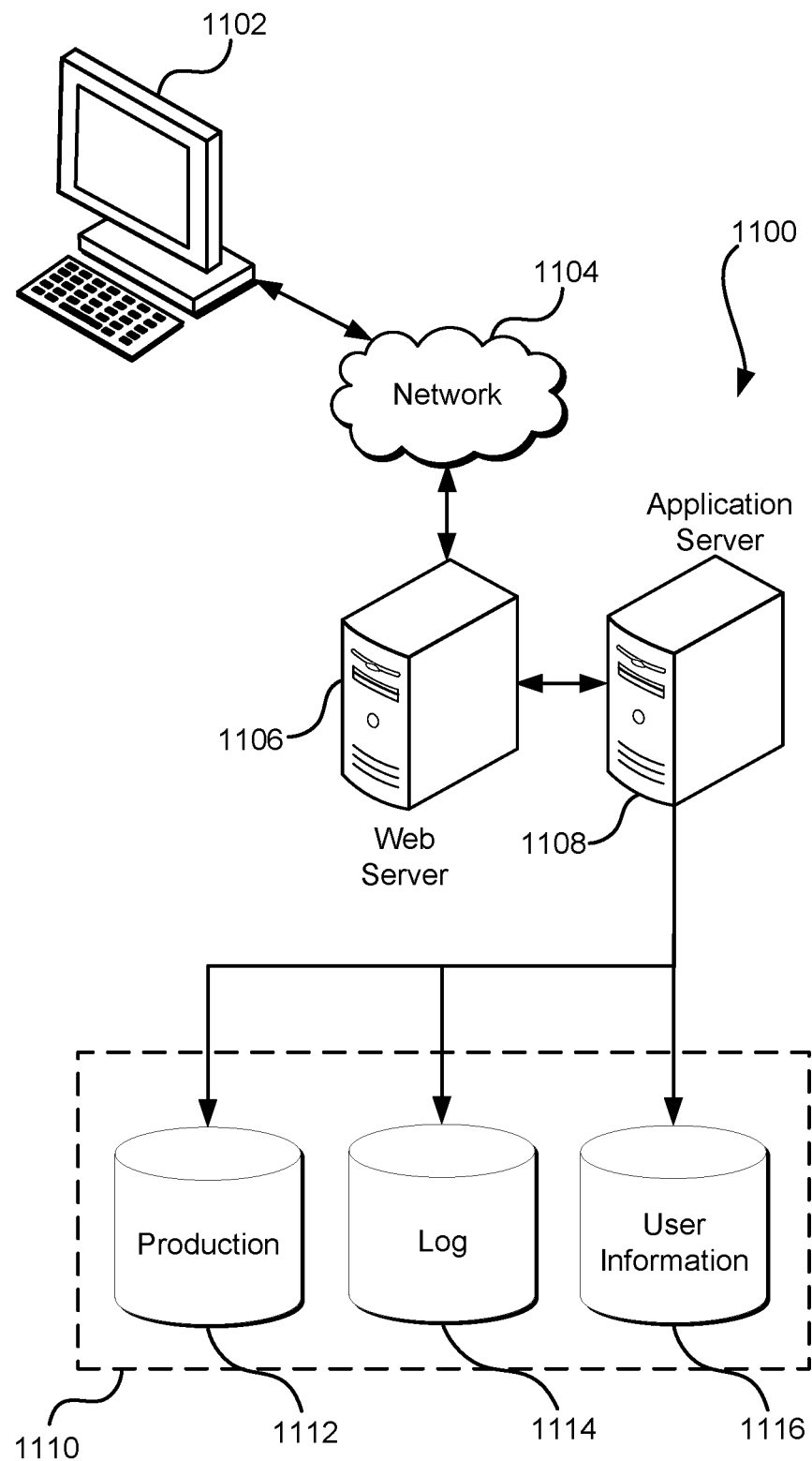
FIG. 11 illustrates a system in which various embodiments can be implemented, in accordance with one embodiment.

FIG. 11 illustrates aspects of an example system 1100 for implementing aspects in accordance with various embodiments. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110 and it should be understood that there can be several application servers, layers or other elements, processes or components, which may be chained or otherwise configured, which can interact to perform tasks such as obtaining data from an appropriate data store. Servers, in an embodiment, are implemented as hardware devices or virtual computer systems and refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. The application server can include any appropriate hardware, software and firmware for integrating with the data store as needed to execute aspects of one or more applications for the client device, handling some or all of the data access and business logic for an application. In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, analysis or other such purposes. In an embodiment, other aspects such as page image information and access rights information are stored in the data store in any of the above listed mechanisms as appropriate or in additional mechanisms in the data store 1110. The data store 1110, in an embodiment, is operable, through logic associated therewith, to receive instructions from the application server 1108 and obtain, update or otherwise process data in response thereto and the application server 1108 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content.

In an embodiment, each server typically includes an operating system that provides executable program instructions for the general administration and operation of that server and includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular, wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a set of parameters usable to update a set of access control policies of a user, wherein the set of parameters indicate actionable criteria to allow or restrict access to the user to a set of resources;
    determining access information in response to a query for a set of access logs associated with the access to the user to the set of resources, wherein the query is based at least in part on the set of parameters;
    enumerating the set of parameters based at least in part on the access information;
    defining a set of conditions, based at least in part on the enumerated set of parameters, by which corresponding policies of the set of access control policies were exercised by the user to access the set of resources, wherein the defining comprises:
        at least determining whether the access by the user to the set of resources indicated by the set of access logs satisfy the actionable criteria, and further wherein the set of access control policies comprises a first indication of a grant of access to the user to a first resource of the set of resources that the set of access logs indicates was not accessed by the user over a predetermined period of time;
    updating the set of access control policies according to the set of conditions such that, if a request by the user to access the first resource fails to satisfy the set of conditions, fulfillment of the request involves additional authentication, wherein updating the set of access control policies comprises adding an indication of the additional authentication for access to the user to the first resource in response to using the set of access logs to determine that the first resource was not accessed by the user over the predetermined period of time; and enforcing, on the user, the updated set of access control policies for the set of resources.

2. The computer-implemented method of claim 1, wherein the enumerated set of parameters are determined based at least in part on context data associated with previous requests by the user to access the set of resources, wherein the context data is stored in the set of access logs and comprises a tag associated with a previously accessed resource, and wherein the set of parameters identifies a subset of resources associated with the tag.

3. The computer-implemented method of claim 1, wherein:
the set of access control policies comprises a second indication of a grant of access to a second resource of the set of resources that is, according to the set of access logs, unaccessed by the user.

4. The computer-implemented method of claim 3, further comprising restoring the user's access in response to validating additional authentication information by removing a third indication to deny access to the second resource.

5. A system, comprising memory to store instructions that, as a result of execution by one or more processors, cause the system to:
obtain a set of parameters usable to update a set of permissions of a principal;
determine, based at least in part on previous requests of the principal to access a set of resources, access information usable to construct, from the set of parameters, an enumerated set of parameters for the set of permissions, wherein:
the set of permissions were not exercised in the principal's previous requests to access the set of resources, and
the set of parameters indicate conditions for allowing or restricting access to the principal to the set of resources, based at least in part on different permissions of the set of permissions for the principal to access individual resources of the set of resources;
update the set of permissions for the principal based at least in part on the enumerated set of parameters such that the updated set of permissions causes different requests for the individual resources to have different authentication requirements, wherein updating the set of permissions comprises:
adding an indication to restrict access to the principal to one or more resources of the set of resources that were unaccessed by the principal's previous requests; and
determining whether the principal's previous requests to access the individual resources of the set of resources satisfy the conditions, and further wherein the indication to restrict access comprises additional authentication requirements for access to the principal to the one or more resources; and
enforce access to the principal to the set of resources based at least in part on the updated set of permissions.

6. The system of claim 5, wherein the instructions that update the set of permissions based at least in part on the set of parameters include instructions that cause the principal to lose access to at least a portion of the set of resources.

7. The system of claim 5, wherein the instructions, as a result of execution by the one or more processors, further cause the system to:
obtain a request from the principal to access a resource;
determine, based at least in part on the updated set of permissions, to condition fulfillment of the request on obtaining additional authentication;
obtain additional authentication information; and
in response to validating the additional authentication information, grant access to the resource.

8. The system of claim 5, wherein the instructions, as a result of execution by the one or more processors, further cause the system to:
obtain the principal's previous requests from a set of access logs; and
determine the access information usable to construct the enumerated set of parameters based at least in part on context data associated with the principal's previous requests.

9. The system of claim 8, wherein the context data comprises a network address and the enumerated set of parameters comprises a range of network addresses that includes the network address.

10. The system of claim 8, wherein the principal's previous requests obtained from the set of access logs have request times that are no older than a predetermined time.

11. The system of claim 5, wherein the instructions that update the set of permissions include instructions that cause the principal to gain one or more permissions usable to gain additional access rights.

12. The system of claim 5, wherein the set of parameters comprise a network address previously used to submit at least some of the principal's previous requests.

13. A non-transitory computer-readable storage medium storing executable instructions that, as a result of being executed by one or more processors of a computer system, cause the computer system to at least:
obtain a set of parameters usable to update a set of permissions of a principal;
determine, based at least in part on previous requests of the principal to access a set of resources, access information usable to construct an enumerated set of parameters, from the set of parameters, for the set of permissions for the principal;
construct the enumerated set of parameters for the set of permissions associated with the principal based at least in part on a set of resources accessed by the principal, wherein the set of permissions were not utilized in accessing the set of resources, and further wherein the enumerated set of parameters indicate rules for allowing or restricting access to the set of resources, based at least in part on different permissions of the set of permissions for individual resources of the set of resources;
update the set of permissions, based at least in part on the enumerated set of parameters, wherein different requests for the individual resources of the set of resources have different authentication requirements based at least in part on the enumerated set of parameters, wherein updating the set of permissions comprises:
adding the different authentication requirements for access to one or more resources that were not utilized in accessing the set of resources; and
determining whether providing access to the principal to the set of resources satisfies the rules; and enforce, on the principal, access to the set of resources based at least in part on the updated set of permissions.

14. The non-transitory computer-readable storage medium of claim 13, wherein the instructions further comprise instructions that, as a result of being executed by the one or more processors, cause the computer system to:
   obtain a first request from the principal to access a resource of the set of resources; and
   determine, based at least in part on the updated set of permissions, to deny fulfillment of the first request.

15. The non-transitory computer-readable storage medium of claim 14, wherein the instructions to enforce access to the set of resources further comprise instructions that, as a result of being executed by the one or more processors, cause the computer system to:
   store information usable to submit a second request based at least in part on the first request;
   request additional authentication based at least in part on the different authentication requirements;
   obtain additional authentication information;
   determine, based at least in part on validating the additional authentication information, to submit the second request on behalf of the principal to access the resource of the set of resources; and
   fulfill the second request.

16. The non-transitory computer-readable storage medium of claim 15, wherein the instructions that cause the computer system to submit the second request on behalf of the principal further include instructions that cause the computer system to submit the second request on behalf of the principal by at least assuming a role comprising permissions associated with the principal, wherein the permissions associated with the principal differ from second permissions associated with the computer system.

17. The non-transitory computer-readable storage medium of claim 15, wherein the instructions further comprise instructions that, as a result of being executed by the one or more processors, cause the computer system to:
   transmit a notification to an administrator user indicating the first request was denied; and
   obtain the additional authentication information from the administrator user.

18. The non-transitory computer-readable storage medium of claim 13, wherein the instructions to construct the enumerated set of parameters comprise instructions that, as a result of being executed by the one or more processors, cause the computer system to:
   determine context data for a set of requests that indicate the set of resources were accessed by the principal; and
   determine the enumerated set of parameters based at least in part on the context data.

19. The non-transitory computer-readable storage medium of claim 18, wherein the context data comprises a tag associated with a previously accessed resource and the enumerated set of parameters identifies a set of resources associated with the tag.

20. The non-transitory computer-readable storage medium of claim 13, wherein the enumerated set of parameters comprise:
   a set of binary conditions that evaluate to a true or false result indicating whether access to an individual resource of the set of resources should be revoked; and
   a set of effects that indicate contingent conditions upon which one or more effects are to be enforced on the principal for the individual resource of the set of resources.

* * * * *